3,578,707
PRODUCTION OF UNSATURATED
ALIPHATIC ACIDS
James Robert Bethell and David James Hadley, Epsom Downs, Surrey, England, assignors to BP Chemicals (U.K.) Limited, London, England
No Drawing. Continuation-in-part of application Ser. No. 497,496, Oct. 18, 1965, which is a division of application Ser. No. 4,221, Jan. 25, 1960. This application July 19, 1967, Ser. No. 654,372
Claims priority, application Great Britain, Feb. 17, 1959, 5,396/59; Apr. 15, 1959, 12,881/59
Int. Cl. C07c 57/04
U.S. Cl. 260—530           7 Claims

ABSTRACT OF THE DISCLOSURE

Process for producing unsaturated aliphatic acids such as acrylic acid and methacrylic acid from the corresponding aldehyde or compounds giving rise to them under the reaction conditions by passing the starting material over a catalyst comprising cobalt molybdate and optionally a quantity of tellurium or an oxide of tellurium.

---

This is a continuation-in-part of U.S. Ser. No. 497,496, filed Oct. 18, 1965, now abandoned which in turn is a divisional application of U.S. Ser. No. 4,221, filed Jan. 25, 1960. The present invention relates to the production of unsaturated aliphatic acids such as acrylic acid and methacrylic acid.

According to the present invention the process for the production of acrylic acid or methacrylic acid comprises reacting at an elevated temperature in the vapour phase acrolein or methacrolein, or a compound which gives rise to acrolein or methacrolein under the reaction conditions with molecular oxygen over a cobalt molybdate oxidation catalyst including elemental tellurium or a tellurium oxide.

The preferred starting material is acrolein or a compound giving rise to acrolein under the reaction conditions, such as propylene. Mixtures of acrolein and propylene may be used. The expression "cobalt molybdate" as used in the claims refers to the substance generally known as cobalt molybdate. This substance may exist as a mixture of the oxides of molybdenum and cobalt or as a compound of molybdenum, cobalt and oxygen, or as a mixture of said oxides and said compound. The catalyst contains minor proportions of elemental tellurium or tellurium oxides. A particularly preferred catalyst comprises small proportions of tellurium dioxide. The catalyst may if desired be deposited on a support such as alumina or silica. The cobalt molybdate may be conveniently prepared, for example by precipitation from mixed solutions of cobalt and molybdenum salts. It is preferred to prepare the cobalt molybdate by forming a complex of (a) cobalt oxides, (b) molybdenum oxides, and (c) ammonia or a water-soluble aliphatic amine, and subjecting the complex to a heat-treatment. The cobalt molybdate is suitably prepared, for example by mixing an aqueous solution of a cobalt salt with an aqueous solution or suspension of molybdic acid or a molybdic acid salt, adding ammonia or a water-soluble aliphatic amine such as ethanolamine to the aqueous mixture, drying the resulting precipitate, and heating it to a temperature in the range 400° to 700° C. A variation of this method is to form an aqueous solution of a cobalt salt and ammonium molybdate, heating the mixture until a precipitate forms, drying the precipitate and subjecting it to a heat treatment as before. Another method of preparing the cobalt molybdate consists in adding ammonia or a water-soluble amine to an aqueous solution of a cobalt salt, and mixing the resulting precipitate with molybdic acid or a salt or molybdic acid with a volatile base either as such or as a solution or suspension for instance in water, the mixture then being evaporated to dryness and subjected to heat treatment as described above. The tellurium or tellurium oxide may then be admixed with the cobalt molybdate as by co-grinding or physical mixing for example.

The ratio of cobalt to molybdenum in the cobalt molybdate may vary within moderately wide limits, but it is preferred to use a molar ratio not substantially greater than 1:1. The tellurium or oxide is conveniently supplied at levels yielding from 0.01 to 50 weight percent expressed as tellurium in the final composition.

The reaction may be carried out in any suitable manner, for instance as a fixed bed process, or as a fluidised bed process.

The proportion of aldehyde in the feed may vary within wide limits, for example between 1 and 20% by volume, and preferably between about 2 and 10% by volume.

The concentration of oxygen in the feed may also vary within moderately wide limits, for example between 1 and 20% by volume and preferably between 2 and 15% by volume. The oxygen may be diluted with inert gases, and may be, for example supplied as air.

It is preferred to carry out the reaction in the presence, as diluent, of a gas which is substantially inert under the conditions of reaction, for example, nitrogen, propane, butane, isobutane, carbon dioxide and steam. It is preferred to use steam or nitrogen or mixtures thereof. The concentration of the steam may vary within wide limits, for instance between 20 and 60% by volume of the feed.

The reaction is carried out at an elevated temperature, between 300 and 500° C.

The contact time may be, for example, in the range 1–30 seconds.

The unsaturated acid may be recovered from the reaction products in any suitable manner, for example by esterification, by salt formation, or by extraction with a solvent such as water followed by fractional distillation.

The process of the invention is further illustrated by the following examples. In the examples, parts by weight and parts by volume bear the same relation to each other as do grams to millilitres.

EXAMPLE 1

A solution of cobalt nitrate (291 parts by weight) in water (300 parts by volume) was added to a solution of ammonium molybdate (177 parts by weight) in water (200 parts by volume) and to this well-stirred mixture, ammonia solution (80 parts by volume of 0.880 ammonia in 80 parts by volume of water) was added dropwise. The precipitate was collected and thoroughly washed with water. It was then dried and decomposed by heating until ammonia ceased to be evolved.

The material was then heat treated at 650° C. for 16 hours and sieved to 8 to 16 mesh B.S.S. and thereafter 26 parts by weight was mixed with 0.04 part by weight of tellurium dioxide. The cobalt molybdate had a ratio of Mo:Co of 1.07:1.

A gaseous mixture of 9.9% by volume of propylene, 49.4% of air and 40.7% of steam were passed over the catalyst maintained in a reactor at 450° C., the contact time being 4.03 seconds.

Of the propylene fed to the reactor, 24.4% was converted to acrylic acid, 5.15% to acrolein, 3.75% to carbon dioxide and 57.9% was recovered unchanged.

The yield of acrylic acid based on propylene consumed was 58.1%.

EXAMPLE 2

Ammonium molybdate (176.6 parts by weight) was dissolved in 200 parts by volume of distilled water. 83 parts by volume of ammonia (specific gravity 0.880)

were added to the ammonium molybdate solution maintained at 60° C. Cobalt nitrate hexahydrate (291.1 parts by weight) was dissolved in 300 parts by volume of distilled water. The cobalt nitrate solution, at 60° C., was added slowly with stirring to the ammoniacal ammonium molybdate, maintaining the temperature at about 60° C. Stirring was continued for 15 minutes after the cobalt nitrate solution had been added to the ammoniacal ammonium molybdate solution. The suspension of cobalt molybdate was allowed to stand overnight, filtered, washed with water, dried and ground to a powder.

The cobalt molybdate was then mixed with tellurium dioxide in 1:1 molar ratio by grinding. The resultant mixture was heated in air at 400° C. for 4.5 hours. A gas mixture comprising 3.1% volume of isobutene and 96.9% by volume of air was passed over the catalyst maintained in a reactor at 350° C., the contact time being 4 seconds.

Of the isobutene fed, 13.9% was converted to methacrylic acid, and 24.1% to carbon dioxide. 1.4% of the isobutene was recovered unchanged. The yield of methacrylic acid based on isobutene consumed was 14%.

The term "cobalt molybdate" as used in the appended claims is defined as (I) a mixture of the oxides of molybdenum and cobalt, and/or (II) a compound of molybdenum, cobalt and oxygen.

EXAMPLE 3

Cobalt molybdate catalyst prepared as in the previous examples (100 parts by weight), tellurium (0.3 part by weight) and tellurium dioxide (0.26 part by weight) were mixed and placed in a reactor, through which a gaseous feed of 10% acrolein, 10% oxygen, 50% nitrogen and 30% steam were passed at 394° C. and 4 seconds contact time. Of the acrolein fed, 61% was converted to acrylic acid and 22% was recovered. The efficiency of conversion of acrolein to acrylic acid was 78%.

Under the same conditions, but in the absence of tellurium and tellurium dioxide, the yield of acrylic acid was 58.7% and 12.4% of the acrolein was recovered. The efficiency of conversion of acrolein to acrylic acid was 67%.

Similar results are obtained when the foregoing procedure is repeated using an equivalent amount of methacrolein in place of the acrolein.

Moreover, similar results are obtained when the foregoing procedure is repeated, using either tellurium or tellurium dioxide alone with the cobalt molybdate catalyst in place of the mixture of tellurium and tellurium dioxide.

What is claimed is:
1. The process which comprises passing, at about 300° to 500° C. in the vapour phase, a feed mixture comprising an unsaturated aliphatic aldehyde selected from the group consisting of acrolein and methacrolein and oxygen over a catalyst of cobalt molybdate and a tellurium-containing substance selected from the group consisting of elemental tellurium and an oxide of tellurium, the weight percent of tellurium-containing substance expressed as tellurium being from 0.01 to 50 percent based on the weight of the entire weight of the catalyst, to produce an unsaturated acid selected from the group consisting of acrylic acid and methacrylic acid.

2. The process of claim 1, wherein the oxide of tellurim is tellurium dioxide.

3. The process of claim 1, wherein the feed mixture comprises an inert gaseous diluent.

4. The process of claim 3, wherein the inert gaseous diluent is steam, nitrogen or mixtures thereof.

5. The process according to claim 3, wherein the aliphatic aldehyde is acrolein.

6. The process as claimed in claim 1, wherein the ratio of cobalt to molybdenum in the cobalt molybdate is about 1:1.

7. The process of claim 6, wherein the aldehyde constitutes from about 1-20 percent, the oxygen constitutes from abotu 1-20 percent and the inert diluent constitutes from about 20-60 percent all by volume of the feed.

References Cited
UNITED STATES PATENTS

| | | | |
|---|---|---|---|
| 3,098,102 | 7/1963 | Bethell et al. | 260—604 |
| 3,322,693 | 5/1967 | Bethell et al. | 252—470 |
| 3,087,964 | 4/1963 | Koch et al. | 260—530U |
| 2,744,928 | 5/1956 | Smith et al. | 260—530U |

LORRAINE A. WEINBERGER, Primary Examiner

R. D. KELLY, Assistant Examiner

U.S. Cl. X.R.
252—470; 260—533